United States Patent
Kelly et al.

(10) Patent No.: US 7,092,017 B2
(45) Date of Patent: Aug. 15, 2006

(54) FIXED PATTERN NOISE REMOVAL IN CMOS IMAGERS ACROSS VARIOUS OPERATIONAL CONDITIONS

(75) Inventors: Sean C. Kelly, Rochester, NY (US); Robert M. Guidash, Rochester, NY (US); Bruce H. Pillman, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 725 days.

(21) Appl. No.: 10/242,865

(22) Filed: Sep. 13, 2002

(65) Prior Publication Data

US 2004/0051797 A1     Mar. 18, 2004

(51) Int. Cl.
H04N 5/217     (2006.01)
G06K 9/40     (2006.01)

(52) U.S. Cl. ............... 348/241; 382/274; 382/275

(58) Field of Classification Search ............ 348/241, 348/243, 246–251; 382/254, 272–275; 358/530, 358/504, 406
See application file for complete search history.

(56) References Cited

U.S. PATENT DOCUMENTS 6,108,453 A * 8/2000 Acharya ............... 382/254
6,888,568 B1 * 5/2005 Neter ............... 348/222.1
2002/0171819 A1 * 11/2002 Cheung ............... 355/133

* cited by examiner

Primary Examiner—Ngoc-Yen Vu
Assistant Examiner—Adam L. Henderson
(74) Attorney, Agent, or Firm—Peyton C. Watkins

(57) ABSTRACT

CMOS imagers can possess higher levels of imager noise than their predecessors, CCDs. This noise can be of the form of temporal variation and fixed pattern. The fixed pattern component of this noise can be removed, which is known already in the art. The invention in this disclosure is that proper correction can be developed for all imager conditions (imager integration time and imager temperature) using a single FPN (fixed pattern noise) dark map, a single FPN PRNU (pixel response nonuniformity) map, imager integration time and imager temperature. Without this invention, a dark frame capture and a flat field capture (integrating sphere), are required before every image capture, a practical impossibility in typical picture taking. Further, the estimates of both FPN maps (dark and PRNU) in this invention are improved estimates relative to such captured directly preceding image capture since such have be formed with multiple frame averaging at calibration time, thus removing any temporal noise from these map estimates. These dark FPN and PRNU FPN maps are modified by a scaling and biasing functional with the measured values of integration time and of imager temperature. A second approach is to make the biasing and scaling functions dependant only on mean dark response taken from the imager's dark pixels, at time of capture.

9 Claims, 1 Drawing Sheet

FIXED PATTERN NOISE REMOVAL IN CMOS IMAGERS ACROSS VARIOUS OPERATIONAL CONDITIONS

FIELD OF THE INVENTION

This invention applies generally to the field of electronic photography and relates in particular to providing smoothed digital images with reduced noise.

BACKGROUND OF THE INVENTION

Noise reduction is practiced in the art using dark fixed pattern subtraction as in U.S. Pat. No. 6,424,375, here an electronic circuit is used to remove dark fixed pattern noise by electronically adjusting pixel responses to align them to an aim response. U.S. Pat. No. 6,418,241 discloses a system in which column biases are corrected after measuring the average of each column and adjusting each column to some aim bias. The Canon D30 digital camera also apparently performs dark captures with the shutter closed in order to obtain an estimate of the sensor's dark frame response. The invention described here offers significant improvement over the apparently simple concurrent dark frame capture, as described in the prior art. 1) This invention describes dark fixed pattern correction that has been optimized to correct dark the fixed pattern associated with a range of the operational conditions of integration time and 2) It describes pixel response non-uniformity correction which has been optimized for a range of the operational conditions of imager integration time and imager temperature. 3) It also describes an alternate measure of the operational conditions to be used to adjust both the dark fixed pattern map and the pixel response non-uniformity. Here the dark pixels of the imager are averaged and used as means of adjusting the dark fixed pattern and pixel response non-uniformity.

SUMMARY OF THE INVENTION

According to the present invention, there is provided a solution to the problems of the prior art.

According to a feature of the present invention, there is provided a method by which noise can be removed from a digital image captured with an image sensor operating over a wide range of environmental and operational conditions. This method removes both dark fixed pattern noise and pixel response non-uniformity which vary as a function of imager temperature and imager integration time. Dark fixed pattern noise is the pixel to pixel variation in response offset. Pixel Response Non-Uniformity is the pixel to pixel response in variation to an given exposure.

Advantageous Effect of the Invention

The invention has the following advantages.

1. Dark fixed pattern correction is optimized to correct dark fixed pattern associated with imager integration time and imager temperature.

DETAILED DESCRIPTION OF THE INVENTION

Figure 1:
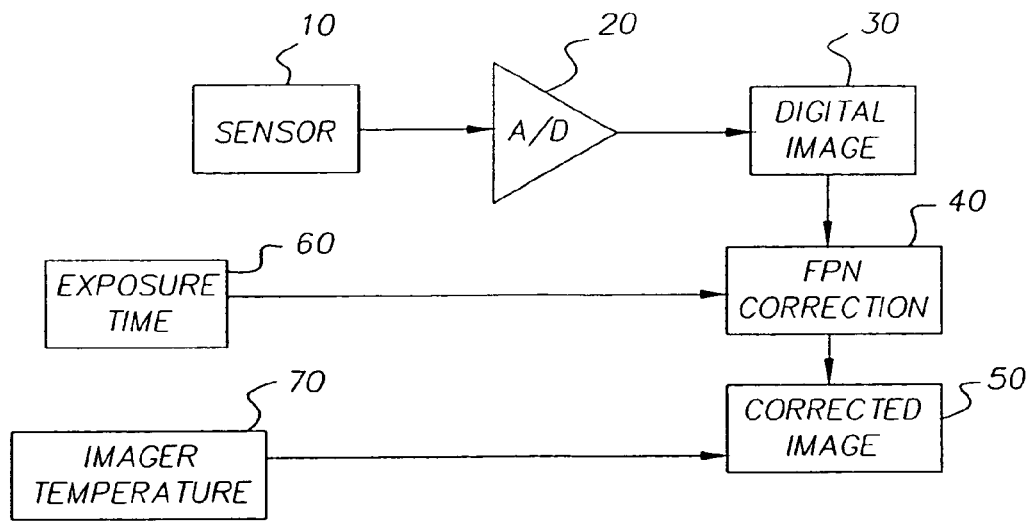
FIGS. 1 and 2 are schematic views of embodiments of the invention.
Figure 2:
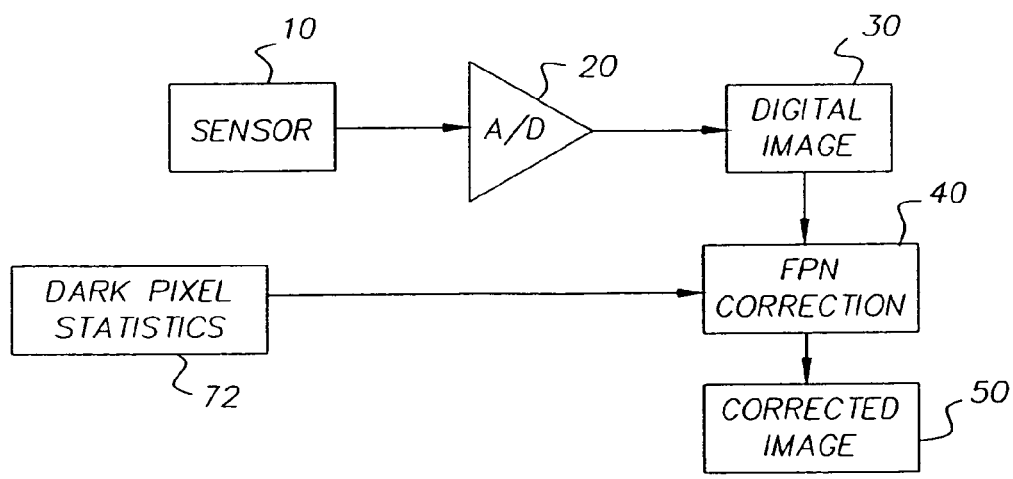

This invention uses one or more dark frames in a calibration phase to estimate a dark current generation rate for each pixel, then use this model to calculate a dark frame to be subtracted during processing for a particular scene. One model, the first one we plan to test, is:

$$CV_D(r, c) = Gs(r, c)\frac{At}{q}e^{-(E_G-E_T)/kT}$$

In this equation:

$CV_D(r,c)$ is counts of dark current signal, for each pixel (row, column index)

G is the analog gain level $s(r,c)$ is a scaling factor for current generation for each pixel A is pixel area, q is the charge an electron, $E_G$ is the band gap, $E_T$ is the impurity energy gap, t is integration time, k is Boltzmann's constant, and T is temperature in Kelvin. By acquiring one or more dark frames at a calibration time, we can estimate:

$$s(r, c) = CV_{DC}(r, c)\frac{q}{G_C A t_C}e^{(E_G-E_T)/kT_C}$$

In this equation, $CV_{DC}(r,c)$ is a mean dark frame at calibration time, $G_C$ is the analog gain at calibration time, $t_C$ is the integration time for the calibration frames, and $T_C$ is the sensor temperature for the calibration frames. This estimation is actually oversimplified, because an actual dark frame has our usual pattern, lag and nonlinearity artifacts. Thus, $CV_{DC}(r,c)$ is really a dark frame after having lag, column offset, column gain, and linearity correction applied.

Variations

The previous formulation explicitly solves for a pixel-by-pixel dark current scaling factor, $s(r,c)$. We could also use some more implicit scaling that doesn't reply as much on knowing an absolute temperature. In this form, we would scale a dark frame by an equation like:

$$CV_D(r, c) = CV_{DC}(r, c)\frac{G}{G_C}\frac{t}{t_C}e^{(E_T-E_G)(T-T_C)/(kTT_C)}$$

If we find that this model is effective over a limited range of integration times and/or temperatures, we could still use the model form to scale dark frames over the effective range.

The technique of calculating a dark frame can:

reduce temporal noise. A brute force dual frame capture includes temporal noise in the dark frame, but averaging several frames at calibration time reduces the noise avoid the problem of interrupting capture of scene frames to capture a dark frame simplify task timing and buffer management within the camera firmware, but not requiring dark frames for multiple times and temperatures The calculated dark frame can:

reduce the effectiveness of dark FPN correction, because the model is not completely accurate delay camera startup, because one or more dark frames must be acquired during startup place more requirements on longer-term stability of the camera electronics. Brute force dark frame acquisition requires excellent stability over a time span f seconds. The model-based approach allows us to predict behavior over a longer term, but only to the extent the model is complete enough.

to keep our dark frame calculations more practical, we're forcing the dark frame model to have a simple scaler for each pixel. We are presuming the terms in the exponent do not very per pixel and there is no offset term for each pixel.

|  | 1/250 sec | 1/125 sec | 1/60 sec | 1/30 sec | 1/15 sec | 1/8 sec | 1/4 sec | 1/2 sec | 1 sec | 2 sec | 4 sec | 8 sec |
|---|---|---|---|---|---|---|---|---|---|---|---|---|
| 0 deg C. | | | | | | | | | | | | |
| 5 deg C. | | | | | | | | | | | | |
| 10 deg C. | | | | | | | | | | | | |
| 15 deg C. | | | | | | | | | | | | |
| 20 deg C. | | | | | | | | | | | | |
| 25 deg C. | | | | | | | | | | | | |
| 30 deg C. | | | | | | | | | | | | |
| 35 deg C. | | | | | | | | | | | | |
| 40 deg C. | | | | | | | | | | | | |
| 45 deg C. | | | | | | | | | | | | |
| 50 deg C. | | | | | | | | | | | | |
| 55 deg C. | | | | | | | | | | | | |
| 60 deg C. | | | | | | | | | | | | |

For example, we are not using an equation like:

$$CV_D(r, c) = G\left[o(r, c) + s(r, c)\frac{AI}{q}e^{-(E_G - E_T)x(r,c)/kT}\right]$$

As always, more terms in a model allow for better empirical fitting, but we clearly prefer a simpler model until we have enough data to suggest we need a more complex one.

Image Sensors can produce an undesirable response known as fixed pattern noise (FPN). FPN is defined as a non-image pattern produced by an image sensor that does not change from capture to capture. Temporal noise, by contrast does change from capture to capture and is random. This invention addresses FPN. There are two types of FPN, dark fixed pattern noise and pixel response nonuniformity (PRNU). Dark FPN is described as pixel to pixel offset in response when operating the imager in the absence of incident illumination (e.g., the shutter is closed or the lens is capped). PRNU is described as the response of an already dark FPN corrected imager, to uniform incident illumination (e.g., imager imaging an integrating sphere). This invention describes the correction of both of these types of noise (Dark FPN, PRNU) across a range of operational conditions (imager temperature and imager integration time).

While the image noise the invention reduces is referred to as fixed pattern noise, it does vary with the operational conditions of imager integration time and temperature. This variation is however quite predictable, where temporal noise is highly variable from capture to capture and unpredictable.

The strategy or procedure to follow in this invention is, to perform an calibration in which the imager is temperature controlled across the range of temperatures the imager will experience in use, and for each temperature, the imager is also operated across the full range of imager integration times. One can envision a 2D matrix of time and temperature:

In each cell of this matrix, a series of dark captures (e.g., lens capped) are taken and a series of flat fields (e.g., integrating sphere) are captured. The dark captures are averaged together in order to remove temporal noise from the estimate of the dark fixed pattern noise at that time and temperature. The flat field captures are similarly averaged together, but only after they have been each individually corrected for dark FPN. This is achieved by subtracting the dark FPN estimate computed above (by averaging together each dark frame), from each individual flat field captures. After each individual flat field image has been dark corrected, they call all be averaged together. This frame averaged flat field image shows any pixel response variation residual in the image. Each color channel is then used to form an aim response to which all pixels will be gained. The aim response is defined as the average of each color channel in the center ¼ of the imager's format. After the 3 aim values are defined (e.g., RGB), a per pixel gain is computed.

That gain is defined as:

$Gain_{ij} = Aim_{Red}/PixRsp$ if a Red Pixel $Gain_{ij} = Aim_{Green}/PixRsp$ if a Green Pixel $Gains_{ij} Aim_{Blue}/PixRsp$ if a Blue Pixel After both dark FPN and PRNU correction maps are defined per cell in the matrix above (across operational time and temperature), the functional relationship between the independent variables of time and temp and measured dark FPN and PRNU maps is assessed. The imager's nominal (nominal or typical operational conditions) FPN, at a minimum will be scaled and or biased as a function of integration time and temperature when the imager is operating in other than nominal operational conditions. That functional relationship is determined with regression. The regressions are linear, higher order or an exponential function in time and temperature.

The invention has been described in detail with particular reference to certain preferred embodiments thereof, but it will be understood that variations and modifications can be effected within the spirit and scope of the invention.

PARTS LIST

| | |
|---|---|
| 10 | Sensor |
| 20 | Analog to Digital Convertor |
| 30 | Digital Image |
| 40 | FPN Correction |
| 50 | Corrected Image |
| 60 | Exposure Time |
| 70 | Imager Temperature |

What is claimed is:

1. A method for reducing or eliminating fixed pattern noise and pixel response non-uniformly in an image sensor, the method comprising the steps of:
    (a) creating averaged fixed pattern noise and pixel response non-uniformity maps during an initial calibration that creates a base map for either or both fixed pattern noise and/or pixel response non-uniformity;
    (b) determining a transfer function of the fixed pattern noise and pixel response non-uniformity with respect to either or both the integration time and temperature;
    (c) at image capture, synthesizing a new fixed pattern noise and pixel response non-uniformity map from either or both the integration time and temperature of the capture by applying the transfer function to the base map; and
    (d) correcting the image capture for either or both fixed pattern noise and pixel response non-uniformity with the new maps.

2. The method as in claim 1, wherein step (a) includes averaging multiple dark frames to create the base map for fixed pattern noise.

3. The method as in claim 1, wherein step (a) includes averaging multiple light frames to create the base map for pixel response non-uniformity.

4. The method as in claim 1, wherein step (b) includes determining temperature via measurement.

5. The method as in claim 1, wherein step (b) includes determining temperature via dark pixel statistics.

6. A method for reducing or eliminating fixed pattern noise in an image sensor, the method comprising the steps of:
    (a) creating an averaged fixed pattern noise map during an initial calibration that creates a base map for fixed pattern noise;
    (b) determining a transfer function of the fixed pattern noise with respect to either or both integration time and/or temperature;
    (c) at capture, synthesizing a new fixed pattern noise map from either or both the integration time and/or temperature of the capture by applying the transfer function to the base map; and
    (d) correcting the image capture for fixed pattern noise with the new map.

7. The method as in claim 6, wherein step (a) includes averaging multiple dark frames to create the base map for fixed pattern noise.

8. A method for reducing or eliminating pixel response non-uniformity in an image sensor, the method comprising the steps of:
    (a) creating a pixel response non-uniformity map during an initial calibration that creates a base map for pixel response non-uniformity;
    (b) determining a transfer function of the pixel response non-uniformity with respect to either or both integration time and/or temperature;
    (c) at capture, synthesizing a pixel response non-uniformity map from either or both the integration time and/or temperature of the capture by applying the transfer function to the base map; and
    (d) correcting the image capture for pixel response non-uniformity with the new map.

9. The method as in claim 8, wherein step (a) includes averaging multiple light frames to create the base map for pixel response non-uniformity.

* * * * *